US006955722B2

(12) United States Patent
Ackerman

(10) Patent No.: US 6,955,722 B2
(45) Date of Patent: Oct. 18, 2005

(54) METHOD AND APPARATUS FOR APPLICATION OF A MATERIAL TO A SUBSTRATE

(75) Inventor: Bryan L. Ackerman, Freeland, MI (US)

(73) Assignee: S.C. Johnson Home Storage, Inc., Racine, WI (US)

(*) Notice: Subject to any disclaimer, the term of this patent is extended or adjusted under 35 U.S.C. 154(b) by 0 days.

(21) Appl. No.: 10/608,684

(22) Filed: Jun. 27, 2003

(65) Prior Publication Data
US 2004/0261696 A1 Dec. 30, 2004

(51) Int. Cl.$^7$ .............................................. B05C 5/02
(52) U.S. Cl. .................... 118/315; 118/324; 118/325; 156/578; 222/410; 137/624.13
(58) Field of Search .......................... 118/25, 315, 324, 118/325, 410, 419; 156/578; 222/319, 330, 222/336, 410, 485, 550, 504; 137/624.13, 137/625.11, 625.16, 625.46; 239/99, 101, 239/581.1, 583

(56) References Cited

U.S. PATENT DOCUMENTS

| 2,631,768 | A |   | 3/1953  | Martin et al. ............... 226/95   |
|-----------|---|---|---------|---------------------------------------|
| 2,718,339 | A |   | 9/1955  | Pankratz ..................... 222/479 |
| 2,827,928 | A |   | 3/1958  | Guckel ....................... 141/134  |
| 3,182,867 | A |   | 5/1965  | Barosko et al. ............ 222/486    |
| 3,286,689 | A |   | 11/1966 | Ziemba ...................... 118/411  |
| 3,340,824 | A |   | 9/1967  | Talbot ......................... 107/1  |
| 3,684,641 | A |   | 8/1972  | Murphy ...................... 161/129  |
| 3,961,755 | A | * | 6/1976  | Morine et al. ............... 239/319  |
| 3,991,917 | A |   | 11/1976 | Moen ......................... 222/486  |
| 4,026,237 | A |   | 5/1977  | Flanagan ..................... 118/5    |
| 4,095,554 | A |   | 6/1978  | Moen ............................. 118/3 |
| 4,119,058 | A |   | 10/1978 | Schmermund ............. 118/411       |
| 4,157,149 | A |   | 6/1979  | Moen ......................... 222/486  |
| 4,162,882 | A |   | 7/1979  | Rose .......................... 425/376 |
| 4,281,619 | A | * | 8/1981  | Frick et al. ................. 118/325  |
| 4,487,796 | A |   | 12/1984 | Lloyd et al. ................ 428/154   |
| 4,507,351 | A |   | 3/1985  | Johnson et al. ............ 428/198     |
| 4,582,231 | A |   | 4/1986  | Warning, Jr. ................ 222/485   |
| 4,735,846 | A |   | 4/1988  | Larsonneur ................. 428/198    |
| 4,770,920 | A |   | 9/1988  | Larsonneur ................. 428/198    |
| 5,083,526 | A |   | 1/1992  | Rothen et al. .............. 118/411    |
| 5,273,188 | A | * | 12/1993 | Sanino ........................ 222/61  |
| 5,383,454 | A |   | 1/1995  | Bucholz ................... 128/653.1   |
| 6,021,524 | A |   | 2/2000  | Wu et al. ...................... 2/167  |
| 6,024,299 | A |   | 2/2000  | Drozkowski ............... 239/290      |
| 6,270,878 | B1|   | 8/2001  | Wegele et al. ............. 428/195     |
| 6,274,232 | B1|   | 8/2001  | Otten et al. ............. 428/315.9    |
| 6,383,614 | B1|   | 5/2002  | Carson et al. ............. 428/206     |

(Continued)

FOREIGN PATENT DOCUMENTS

EP          0275337        7/1988   ..................... 1/62

(Continued)

Primary Examiner—Laura Edwards

(57) ABSTRACT

An apparatus for applying a material to a substrate includes a housing having an inlet passage, a plurality of exit openings, and a recess in fluid communication between the inlet passage and the exit openings. A valve element is disposed in the recess wherein the valve element includes a first portion and a second portion axially displaced from the first portion. Means are provided for moving the valve element in the recess such that the first portion provides continuous fluid communication between the inlet passage and one of the exit openings during movement of the valve element and the second portion provides intermittent fluid communication between the inlet passage and another of the exit openings during movement of the valve element. A method of applying a material to a substrate is also disclosed.

5 Claims, 6 Drawing Sheets

U.S. PATENT DOCUMENTS

| | | | |
|---|---|---|---|
| 6,383,615 B2 | 5/2002 | Otten et al. | 428/206 |
| 6,391,806 B1 | 5/2002 | Carson et al. | 442/327 |
| 6,422,551 B1 | 7/2002 | Brotz | 269/289 R |
| 6,451,410 B1 | 9/2002 | McGuire et al. | 428/156 |
| 6,468,646 B2 | 10/2002 | Carson et al. | 428/315.9 |
| 6,579,816 B2 | 6/2003 | Lockett | 442/417 |
| 6,592,983 B1 | 7/2003 | Carson et al. | 428/323 |
| 6,617,004 B2 | 9/2003 | Lake et al. | 428/138 |
| 2002/0020768 A1 | 2/2002 | Held et al. | 239/562 |
| 2002/0082540 A1 | 6/2002 | Johnston et al. | 602/48 |

FOREIGN PATENT DOCUMENTS

| | | | |
|---|---|---|---|
| WO | WO 00/29209 | 5/2000 | 27/26 |

\* cited by examiner

METHOD AND APPARATUS FOR APPLICATION OF A MATERIAL TO A SUBSTRATE

TECHNICAL FIELD

The present invention relates to the application of a material to a substrate, and more specifically to the application of a pattern of material to a substrate.

BACKGROUND ART

Ziemba U.S. Pat. No. 3,286,689 discloses a device for applying adhesive to surfaces. A fluid pressure diaphragm, defining a rear wall of a receiving chamber, includes projecting portions, which are used to close off orifices located in a front wall of the receiving chamber. Means are included to seal individual orifices in order to control the flow of the adhesive.

Moen U.S. Pat. No. 3,991,917 discloses a selectively actuable flexible stem valve. A flexible valve stem extends from a valve stem holder to a valve seat, where a valve element normally engages the valve seat to close an outlet. External operator means are provided to laterally flex the valve stem and thereby open the outlet.

Warning, Jr. U.S. Pat. No. 4,582,231 discloses an apparatus for applying liquid. A contact applicator head is described, which includes a plurality of needle valves. The needle valves are spring biased into respective extrusion orifices. A rotary cam is used to retract the needles from the extrusion orifices to provide a positive closing force to close each associated needle valve whereby subsequent dripping or oozing of the liquid from the orifice is eliminated.

Rothen et al. U.S. Pat. No. 5,083,526 discloses a glue coating apparatus. The apparatus comprises a reservoir, an applicator head having a plurality of adjacent slit nozzles, and a multiple gear pump which has a separate pump connected to each of the slit nozzles via a respective channel. The apparatus further comprises an applicator valve for communicating with each of the channels and, when actuated, permitting the substance to flow from the gear pump to the respective slit nozzle. A separate return-flow valve is also provided to permit flow of the substance from the multiple gear pump to the reservoir when the respective applicator valve is not actuated.

SUMMARY OF THE INVENTION

According to one aspect of the present invention, an apparatus for applying a material to a substrate includes a housing having an inlet passage, a plurality of exit openings, and a recess in fluid communication between the inlet passage and the exit openings. A valve element is disposed in the recess wherein the valve element includes a first portion and a second portion axially displaced from the first portion. Means are provided for moving the valve element in the recess such that the first portion provides continuous fluid communication between the inlet passage and one of the exit openings during movement of the valve element and the second portion provides intermittent fluid communication between the inlet passage and another of the exit openings during movement of the valve element.

In accordance with another aspect of the present invention, a method of applying a material to a substrate includes the step of providing a housing having an inlet passage, a plurality of exit openings, a recess in fluid communication between inlet passage and the exit openings, and a valve element disposed in the recess. The valve element includes a first portion and a second portion axially displaced from the first portion. The method further includes the steps of providing material to the inlet passage under pressure and moving the valve element in the recess. The first portion permits continuous flow of the material between the inlet passage and one of exit openings during movement of the valve element and the second portion permits intermittent fluid communication between the inlet passage and another of the exit openings during movement of the valve element such that continuous and intermittent flows of material exit the housing and are directed toward the substrate. The substrate is moved as the material is directed thereto so that the material is deposited as continuous and intermittent lines of material thereof.

According to yet another aspect of the present invention, an apparatus for applying an adhesive to a substrate includes a housing having an inlet passage, a plurality of dispensing passages with exit openings, and a recess in fluid communication between the inlet passage and the exit openings. A rotatable valve element is disposed in the recess wherein the valve element includes a plurality of apertured sections each of which is aligned with a dispensing passage.

In accordance with a still further aspect of the present invention, an apparatus for applying an adhesive to a substrate comprises a housing having an inlet passage, a plurality of exit openings, and a recess in fluid communication between the inlet passage and the exit openings. An axially reciprocating valve element is disposed in the recess wherein the valve element includes a plurality of lands and grooves that move into and out of alignment with at least one of the dispensing passages as the valve element axially reciprocates.

Other aspects and advantages of the present invention will become apparent upon consideration of the following detailed description.

DETAILED DESCRIPTION OF THE PREFERRED EMBODIMENTS

Figure 1:
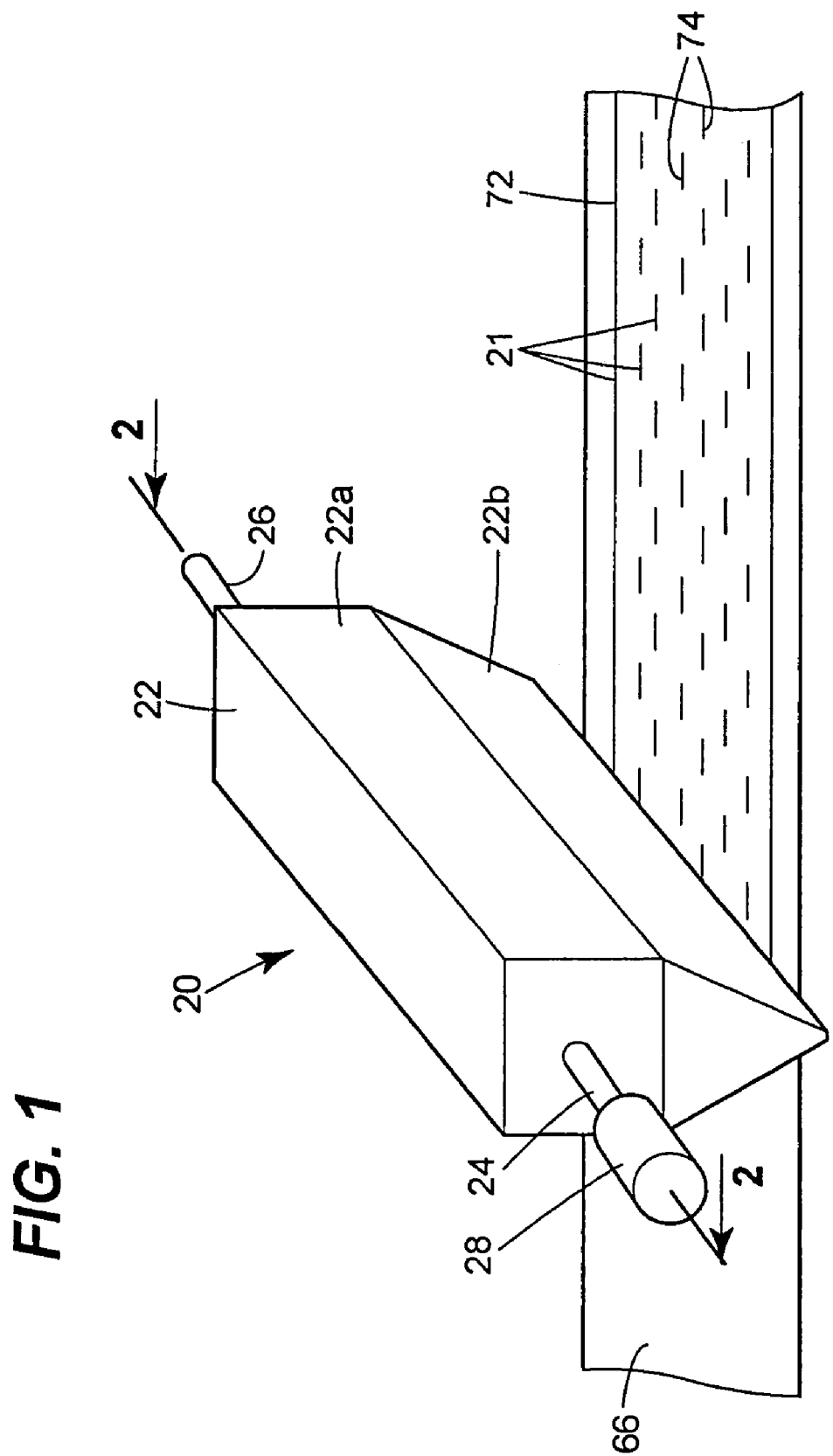
FIG. 1 is an isometric view of an apparatus for depositing material on a substrate according to a first embodiment of the present invention.

Referring now to FIGS. 1–4 a first embodiment of an apparatus 20 for dispensing a material, such as, for example, an adhesive into a pattern is shown. The apparatus includes a housing 22, a rotary valve element 24, and a motor 28 and is adapted to be connected to an adhesive supply tube or conduit 26. The rotary valve element 24 is an elongate member having first and second ends 30, 32. The motor 28 may be of any type that is capable of rotating the rotary valve element 24 and is preferably coupled to the rotary valve element 24 at the first end 30. If desired, however, the motor 28 may be coupled to the rotary valve element 24 in any suitable manner and at any suitable location so that the motor rotates the valve element 24 as noted in greater detail hereinafter.

Figure 2:
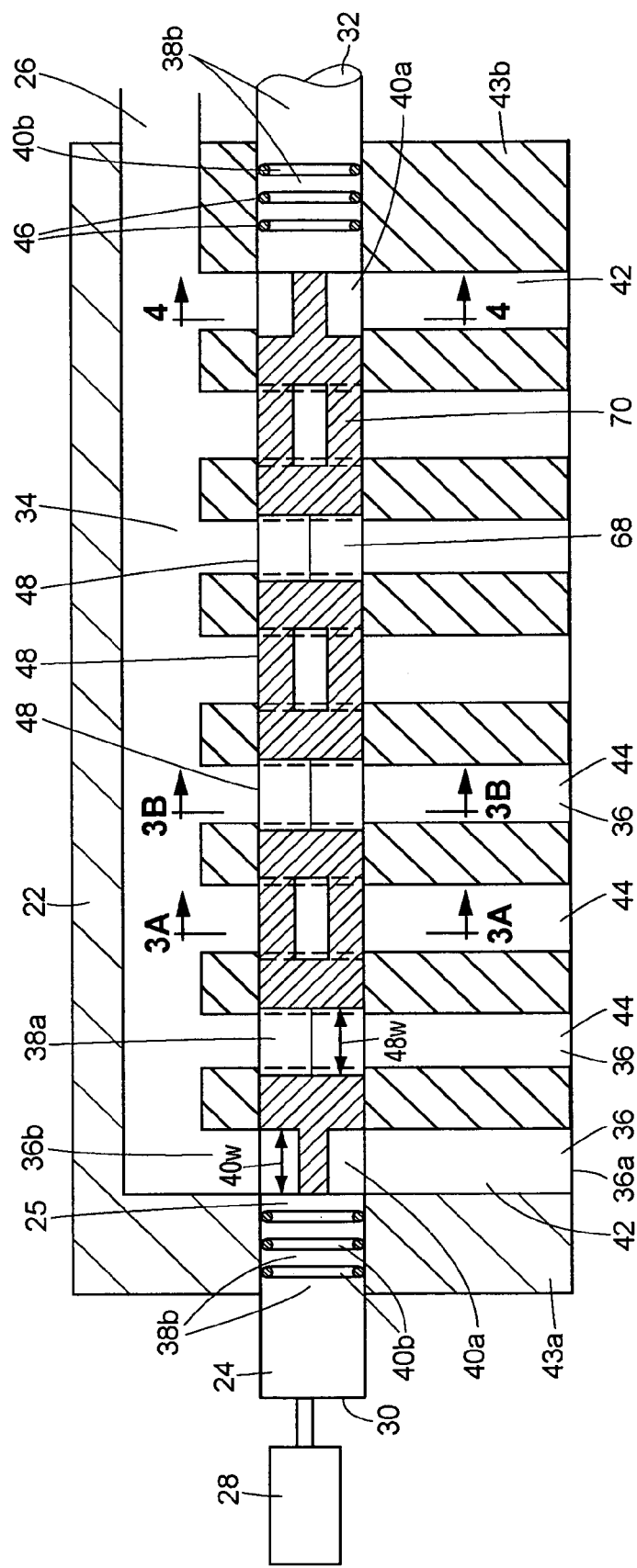
FIG. 2 is an elevational view, partly in section, of the apparatus of FIG. 1 taken generally along the lines 2—2 thereof.

The housing 22 substantially encloses the rotary valve element 24 in a recess 25 and directs the flow of the adhesive 21 under pressure through and/or around the rotary valve element 24. The housing 22 includes an upper portion 22a and a lower portion 22b which are preferably integral with each other. Alternatively, the housing may be constructed of several pieces and bolted or otherwise assembled and secured together. The interior of the housing 22, as seen in FIG. 2, further includes an adhesive inlet passage 34, and a plurality of adhesive dispensing passages 36. The dispensing passages 36 include two outer passages 42 and a plurality of inner passages 44. Preferably, although not necessarily, the dispensing passages 36 are all of substantially identical size and dimension and each has a circular cross section. The rotary valve element 24 is rotatably disposed within the recess 25 of the housing 22 and intersects each of the dispensing passages 36. The adhesive supply tube 26 is connected to the inlet passage 34, and the latter is disposed in the upper portion 22a of the housing 22 and extends along a substantial portion of the length thereof. Each of the plurality of dispensing passages 36 includes an exit opening 36a disposed at the lower edge of the lower portion 22b of the housing 22 and an entrance opening 36b disposed opposite the exit opening 36a. The inlet passage 34 is disposed above the plurality of dispensing passages 36 and is in fluid communication with the entrance openings 36b thereof.

Figure 4:
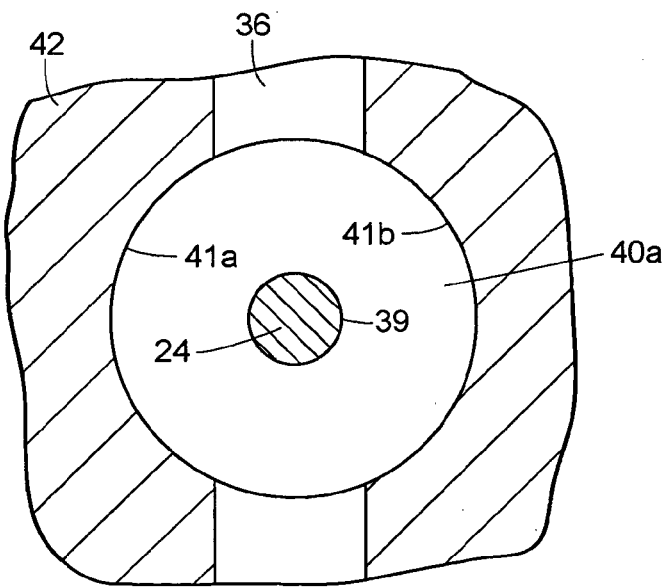
FIG. 4 is a sectional view taken generally along the lines 4—4 of FIG. 2.

As should be evident from the foregoing, and as noted above, the rotary valve element 24 is mounted for rotational movement, i.e., journaled, within the recess 25 of the housing 22 and intersects each of the dispensing passages 36 between the entrance openings 36b and the exit openings 36a. The rotary valve element 24 preferably includes a plurality of lands 38 and grooves 40. The grooves 40 include two channel grooves 40a and a plurality of o-ring grooves 40b. The lands 38 include an inner land 38a and plurality of outer lands 38b. The two channel grooves 40a are aligned with the outer dispensing passages 42, and as seen in FIG. 4, a surface 39 defining each groove 40a is spaced from walls 41a and 41b of the housing 22 to allow continuous passage of the adhesive 21 through the dispensing passages 42 during rotation of the valve element 24. As seen in FIG. 2, the channel grooves 40a preferably (although not necessarily) have a width 40w substantially equal to the width of the associated dispensing passage 42. The inner land 38a is disposed between the channel grooves 40a, while the outer lands 38b are disposed on the sides of the channel grooves 40a opposite the inner land 38a. The outer lands 38b are preferably completely enclosed within outer portions 43a, 43b of the housing 22 and are subdivided by the o-ring grooves 40b, which are of size and dimension to contain an o-ring 46. An arrangement of three o-ring grooves 40b and o-rings 46 is preferably provided in each of the lands 38b to keep the adhesive 21 from escaping outwardly in the interface between the rotary valve element 24 and the housing 22. Alternatively, other arrangements to manage the flow of the adhesive in this region (for example, a different number of o-rings in a corresponding number of grooves or a different sealing arrangement and/or sealing elements) are also considered to be within the scope of the present invention.

Figure 3A:
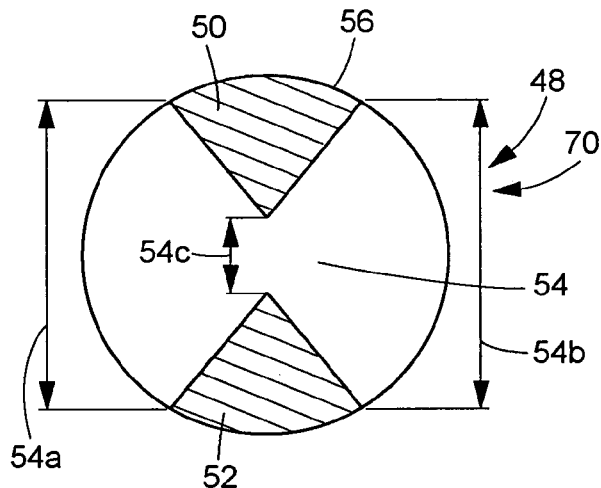
FIGS. 3A and 3B are sectional views taken generally along the lines 3a—3a and 3b—3b, respectively, of FIG. 2.
Figure 3B:
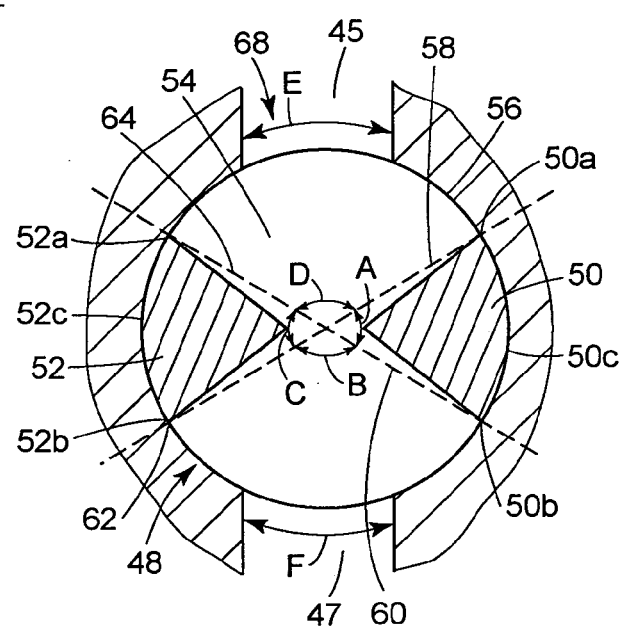

The inner land 38a further comprises a plurality of apertured sections 48. Referring now to FIGS. 3A and 3B, a cross sectional view of one of the apertured sections 48 is shown. Preferably the number of apertured sections 48 is equal to the number of dispensing passages 36 intersected by the inner land 38a; however, a greater or fewer number of apertured sections may be employed. The apertured sections 48 allow intermittent passage of the adhesive 21 from the inlet passage 34 through the rotary valve element 24 and toward the exit opening 36a of the dispensing passage 36. Each apertured section 48 includes a first wall section 50 and a second wall section 52 that together define a bow tie shaped aperture 54 therebetween when viewed in section as seen in FIGS. 3A and 3B. The first and second wall sections 50, 52 are preferably of substantially identical shape and dimension (except for being mirror images of one another), are disposed opposite each other, and extend inwardly toward each other from an exterior surface 56 of the inner land 38a of the rotary valve member 24. As seen in FIG. 3A, the bow tie aperture 54 includes three opening dimensions including two entrance/exit dimensions 54a, 54b and a neck dimension 54c that is shorter than the entrance/exit dimensions 54a, 54b. The entrance/exit dimensions 54a, 54b are preferably substantially equal. However, alternative configurations of the wall sections 54a, 54b that are not identical, and/or are not aligned directly opposite each other are considered within the scope of the present invention and may result in the entrance/exit dimensions 54a, 54b not being equal to each other. Also, while it is highly preferable due to structural stability of the valve element 24 that the neck dimension 54c is shorter then the entrance/exit dimensions 54a, 54b, other wall section arrangements and designs including those where the neck dimension 54c is longer than or equal to one or both of the entrance/exit dimensions 54a, 54b may also be used.

Each wall section 50, 52 extends inwardly from the surface 56 of the inner land 38a of the rotary valve member 24 and defines two edge contact points 50a, 50b, 52a, 52b where the edge of the wall section 50, 52 and the exterior edge 56 are coincident. The wall sections 50, 52 define four angles A, B, C and D. The angle A is subtended by a radial line 58 coincident with the contact point 50a and a radial line 60 coincident with the contact point 50b. The angle B is subtended by the radial line 60 and a radial line 62 coincident with the contact point 52b. Angle C is subtended by the radial line 62 and a radial line 64 coincident with the contact point 52a. The angle D is subtended by the radial line 64 and the radial line 58. As should be evident, the sum of the angles A,B,C, and D is 360°. Preferably, each of the angles, A, B, C, and D is equal to 90°. While the angles A, B, C, and D are preferably substantially equal to each other, this need not be the case.

Preferably, each apertured section 48 is aligned with an associated dispensing passage 36 and may, although not necessarily, have a width 48w that is wider than the width of the associated dispensing passage 36. In a preferred embodiment, each apertured section 48 is circumferentially offset by about 90° relative to adjacent apertured section(s) 48. However, adjacent apertured sections 48 may be circumferentially offset about larger or smaller angles or may be substantially aligned (i.e., displaced substantially at zero degrees with respect to one another) without departing from the spirit of the invention.

In operation, a substrate 66 is provided, preferably in close proximity to the exit end 36a of the dispensing passages 36. As the substrate is moved in relation to the apparatus 20, an adhesive 21 is provided under pressure that passes through the adhesive supply tube 26 and into the inlet passage 34. Because the inlet passage 34 is in fluid communication with each of the dispensing passages 36, the adhesive 21 fills the entire length of the inlet passage 34 and descends into the dispensing passages 36. The motor 28 may then be energized so that the rotary valve element 24 is rotated within the housing 22. The adhesive 21 within the dispensing passages 42 adjacent the outer sections 43a, 43b of the housing 22 flows in the interior grooves 40a and flows out the exit openings 36a of the dispensing passages 42 in a continuous manner. In the remaining dispensing passages 36 intersected by the interior land 38a, the adhesive 21 flows through the rotary valve element 24 intermittently as the rotary valve element 24 rotates. Specifically, as the rotary valve element 24 rotates the apertured sections 48 move from an open position 68 to a closed position 70 (seen in FIG. 2) in relation to the dispensing passages 36. In the open position 68 the bow tie shaped aperture 54 is aligned with the dispensing passage 36 to allow the flow of adhesive 21. In the closed position 70 the bow tie shaped aperture 54 is aligned perpendicular to the dispensing passage 36 thus preventing the passage of adhesive 21. In this regard, it should be noted that the angular extents of one or both outer surfaces 50c, 52c (FIG. 3B) of the wall section 50, 52 should be greater than the angular extents E, F of one or both of openings 45, 47 of the passages 36 so that proper operation is obtained. In this embodiment wherein a rotary valve element 24 having circumferentially offset apertured sections 48 is employed the adhesive is dispensed (i.e., directed toward) and onto a moving substrate 66 in a regular alternating pattern as seen in FIG. 1, provided that the substrate is moved at a constant speed relative to the apparatus 20. The pattern includes continuous outer lines 72 and intermittent inner lines 74.

While a rotary valve element for creating a specific pattern on a substrate 66 has been described, alternative rotary valve configurations for producing alternative adhesive patterns may be employed. More specifically, another embodiment of the rotary valve element 24 may include an extended inner land 38a that intersects all of the dispensing passages 36 and two additional apertured sections 48 to allow only intermittent flow rather than continuous flow from the dispensing passages 42. Alternatively, in another embodiment, the apertured sections 48 may be circumferentially aligned with respect to each other such that the adhesive 21 may be dispensed in a regular aligned pattern, as contrasted with the offset pattern shown in FIG. 1. In yet another embodiment, the apertured sections 48 are circumferentially offset by non-zero and unequal angles relative to one another such that the adhesive is dispensed in an irregular pattern. Also the walls 52, 54 may be shaped such that the intermittently dispensed adhesive portion may be longer or shorter than the length of space between the portions. Furthermore, while an embodiment that dispenses the adhesive directly to the substrate 66 has been described, other embodiments of the invention may include further processing of the intermittently dispensed adhesive, such as changing the size of each portion either in cross-section or width or both before application to any member.

Figure 5:
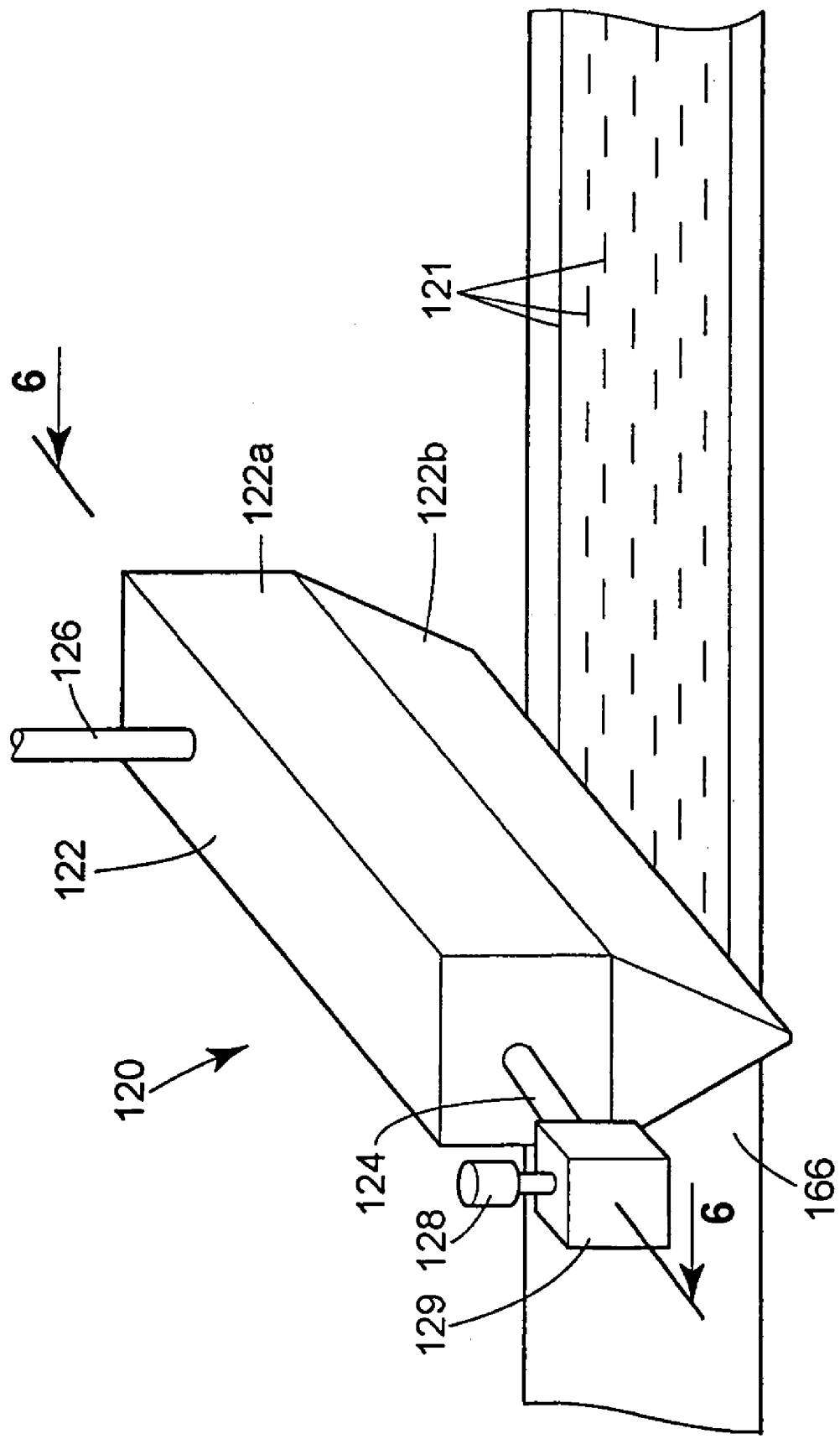
FIG. 5 is an isometric view of a further embodiment of the present invention.
Figure 6:
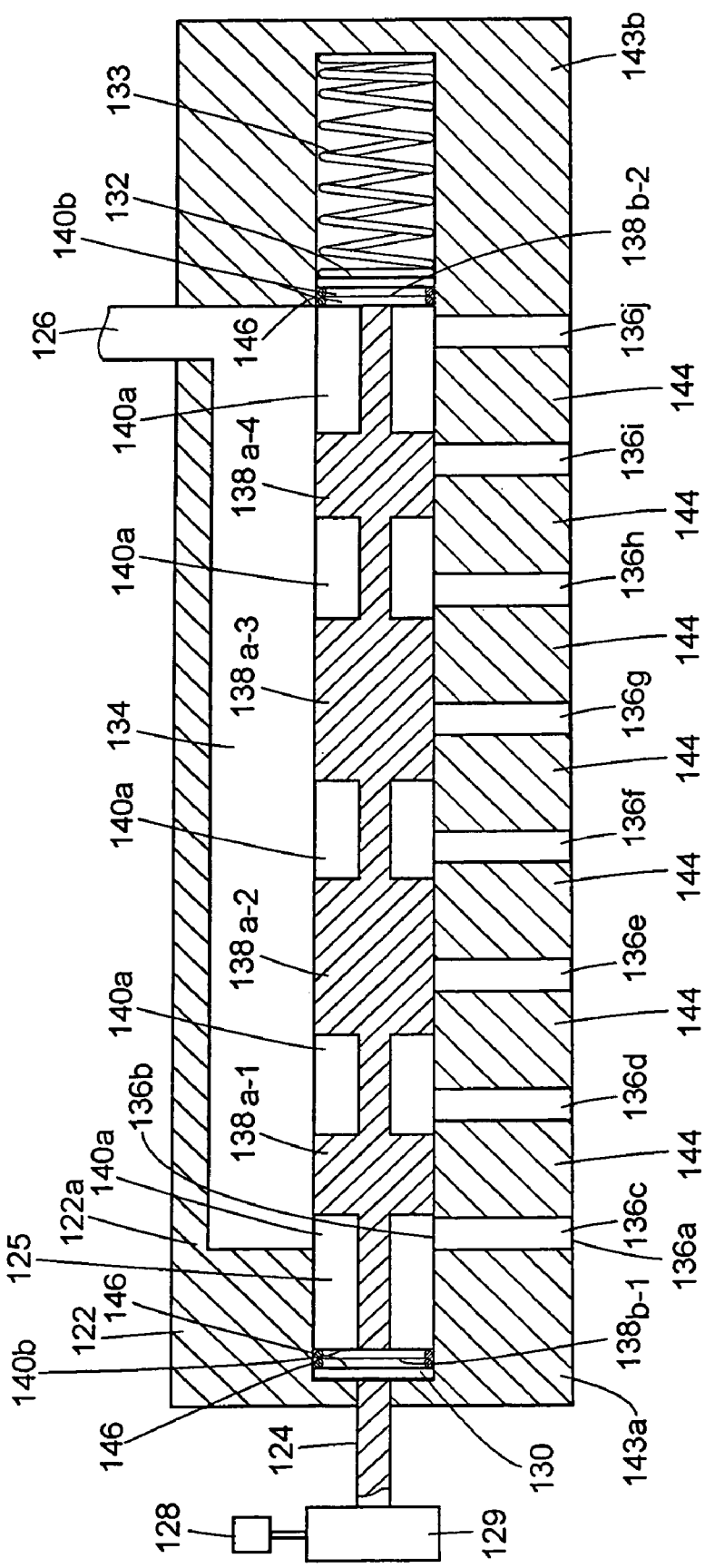
FIG. 6 is an elevational view partly in section, of the apparatus of FIG. 5 taken generally along the lines 6—6 thereof illustrating a valve member in a first position.
Figure 7:
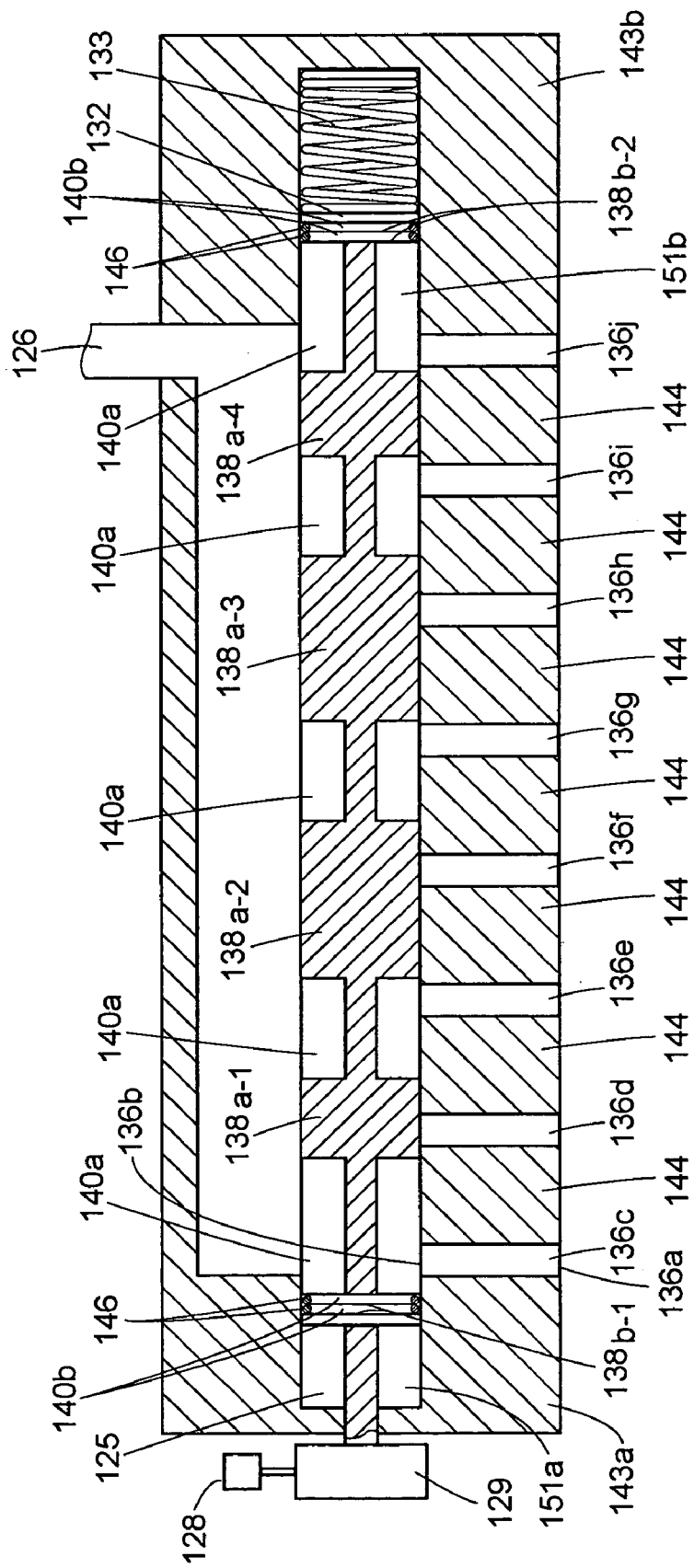
FIG. 7 is a view similar to FIG. 6 illustrating the valve member and a second position.

Another embodiment of an apparatus 120 according to the present invention is shown in FIGS. 5–7. This embodiment utilizes the axially reciprocating motion of a valve element 124 to produce an intermittent pattern of adhesive 121 on a substrate 166. The apparatus 120 includes a housing 122, a valve element 124, an adhesive supply conduit or tube 126, a motor 128, and a cam or other motion translation device 129. The valve element 124 is an elongate member having first and second ends 130, 132. The motor 128 may be of any type that is capable of producing rotational motive power to drive the cam 129. The valve element 124 is biased by a spring 133 to the left as seen in FIGS. 6 and 7 and acts as a cam follower within the housing 122. The valve element 124 thus receives the axially reciprocating motion from the rotation of the cam. In another embodiment, the apparatus may include a second motor and cam to push the valve element 124 in a direction opposite the motion of the first motor 128 and cam 129 and to help keep the valve 124 in tension. Thus, in this embodiment, the spring 133 may be omitted.

The housing 122 substantially encloses the valve element 124 in a recess 125 and directs the flow of the adhesive 121. The housing 122 includes an upper portion 122a and a lower portion 122b which are preferably (although not necessarily, as noted with respect to the previous embodiment) integral with each other. The interior of the housing 122, as seen in FIGS. 6 and 7, further includes an adhesive inlet passage 134 and a plurality of adhesive dispensing passages 136, each of which includes an exit opening 136a and an entrance opening 136b. The dispensing passages 136 are bounded by two outer portions 143a, 143b and are further defined by a plurality of inner portions 144 of the housing 122. Furthermore, each of the dispensing passages 136 is preferably of substantially identical size and dimension, with a preferably circular cross section. The adhesive supply tube 126 connects to the inlet passage 134, and the passage 134 is disposed in the upper portion 122a of the housing 122 and extends along a substantial length of the upper portion 122a. The inlet passage 134 is disposed above the plurality of dispensing passages 136 and is in fluid communication with the entrance openings 136b of each of the dispensing passages 136. Therefore, the adhesive 121 flows under pressure from the inlet passage 134 to the dispensing passages 136. The valve element 124 is mounted for linear motion in the recess 125 of the housing 122 and is disposed above the dispensing passages 136 rather than in the intersecting relationship with the passages 36 shown in FIG. 2.

The valve element 124 preferably, but not necessarily, includes a plurality of lands 138 and grooves 140. The grooves 140 preferably, but not necessarily, include a plurality of channel grooves 140a and plurality of o-ring grooves 140b. The lands 138 preferably include a plurality of inner lands, 138a-1, 138a-2, 138a-3 and 138a-4 and plurality of outer lands 138b-1 and 138b-2. The channel grooves 140a are disposed between the inner lands 138a1–138a4 and between the inner lands 138a1 and 138a4 and the outer lands 138b-1 and 138b-2. The portions of the valve element 124 defining the channel grooves 140a are of size and dimension less than the size and dimension of walls defining the recess 125 and surrounding the grooves 140a thereby allowing the passage of adhesive around the valve element 124 and into the dispensing passages 136. The valve element 124 reciprocates between a first position, shown in FIG. 6 and a second position, shown in FIG. 7. As may be seen in these FIGS., outer dispensing passages 136c, 136j adjacent the outer portions 143a, 143b of the housing 122 are not blocked by the valve element 124 in either the first or the second positions. However, selected remaining dispensing passages 136d–136i are blocked by the inner lands 138a, when the valve element 124 is in the first position and the second position. When a dispensing passage 136 is blocked, a portion of the inner land 138a preferably overlaps the dispensing passage 136 at least slightly to prevent or minimize any adhesive leakage into the blocked dispensing passage 136. This is the result of the shape, dimension and layout of the lands 138 and grooves 140. Preferably, inner lands 138a-1 and 138a-4 are of substantially identical size and dimension to one another and inner lands 138a-2 and 138a-3 are of substantially identical size and dimension to one another, although this need not be the case. In the first position the inner land 138a-1 is disposed between the dispensing passages 136c and 136d and blocks neither passage, the inner land 138a-2 blocks the dispensing passage 136e, the inner land 138a-3 blocks the dispensing passage 136g, and the inner land 138a-4 blocks the dispensing passage 136i. As the motor 128 rotates the cam 129, the valve element 124 axially moves to the second position seen in FIG. 7. In the second position, the inner land 138a-1 blocks the dispensing passage 136d, the inner land 138a-2 no longer blocks the dispensing passage 136e but rather blocks the dispensing passage 136f, the inner land 136a-3 no longer blocks the dispensing passage 136g but rather blocks the dispensing passage 136h, and the inner land 136a-4 no longer blocks the dispensing passage 136i but rather is disposed between the dispensing passages 136i and 136j, blocking neither. The outer lands 138b, o-ring grooves 140b, and o-rings 146 are arranged in a similar manner to the arrangement described above in relation to FIG. 2; however, only two o-ring grooves 140b and o-rings 146 are utilized at each end of the valve element 124. Preferably the o-rings 146 remain enclosed within end recesses 151a, 151b through the entire range of motion of the valve element 124, thereby protecting the o-rings from the adhesive and from possible shearing upon entering and exiting the end recesses 151a, 151b.

In operation, a substrate 166 is provided, preferably in close proximity to the exit opening 136a of the dispensing passages 136. The apparatus may be started in the first or second position or anywhere in between. As the substrate 166 is moved in relation to the apparatus 120, a continuous flow of adhesive 121 passes through the adhesive supply tube 126 and into the inlet passage 134. Assuming that the valve element is initially disposed in the first position, the adhesive 121 travels through the entire length of the inlet passage 134 and descends into the unblocked dispensing passages 136c, 136d, 136f, 136h and 136j. The motor 128 may then be engaged whereby the axially reciprocating motion of the valve element 124 is initiated within the housing 122. The adhesive 121 within the dispensing passages 136c, 136j adjacent the outer sections 142 of the housing 122 flows under pressure in the interior grooves 140a and flows out the exit opening 136a of the dispensing channels 136c, 136j in a continuous manner since the interior grooves 40a do not block the entire dispensing channel 36. As adhesive 121 continuously flows into the housing 122 the valve element continues to reciprocate between the first position and the second position thereby blocking and unblocking dispensing passages 136c–136i and creating patterns similar to the patterns discussed in relation to FIG. 1.

INDUSTRIAL APPLICABILITY

Each of the apparatus and methods disclosed herein can be utilized for applying a material, for example an adhesive to a substrate in a pattern. The pattern can be modified to fill may needs in the processing of substrates. For example, a liquid impermeable layer including a plurality of apertures could be laid onto a substrate with an adhesive pattern applied. When a liquid is applied to the liquid impermeable layer the liquid will naturally flow into the apertures of the layer and onto the substrate. The pattern of adhesive will allow the liquid to spread in a more radial manner from the aperture than a line of adhesive would, thus increasing the flow of liquid from the surface of the layer to the substrate.

As should be evident many different valve designs can be utilized in the practice of the current invention. The design is one that enable a continuous flow of material through the apparatus without having to pause the substrate or flow but resulting in a stitched type pattern of material resulting on the substrate. Furthermore, the present invention allows, for example in an adhesive setting, the use of less adhesive to still accomplish sufficient bonding in comparison to the utilization of all continuous lines of adhesive.

Another advantage of the present invention is its increased longevity and durability. Specifically, known methods in the art use complex devices having opening and closing apertures controlled by needle valves or the like that have short life cycles. The present invention is more durable and long lasting due to the use of a more simple design that utilizes the motion of larger and more durable valves to dispense the materials.

Numerous modifications to the present invention will be apparent to those skilled in the art in view of the foregoing description. Accordingly, this description is to be construed as illustrative only and is presented for the purpose of enabling those skilled in the art to make and use the invention and to teach the best mode of carrying out same. The exclusive rights to all modifications which come within the scope of the appended claims are reserved.

I claim:

1. An apparatus for applying an adhesive to a substrate, comprising:
    a housing having an inlet passage, a plurality of dispensing passages with exit openings, and a recess in fluid communication between the inlet passage and the exit openings;
    a rotatable valve element disposed in the recess, the valve element having a plurality of apertured sections each aligned with a dispensing passage and having a separate entry opening through an exterior surface of the valve;
    wherein a first one of the apertured sections is circumferentially offset from a second one of the apertured sections.

2. The apparatus of claim 1, wherein each of the plurality of apertured sections of the valve element is circumferentially offset with respect to adjacent apertured sections.

3. The apparatus of claim 2, wherein each of the plurality of apertured sections of the valve element is circumferentially offset by about 90° with respect to adjacent apertured sections.

4. The apparatus of claim 1, wherein the number of apertured sections is equal to the number of dispensing passages.

5. The apparatus of claim 1, wherein the valve element further includes at least one first portion aligned with a dispensing passage, the first portion allowing continuous passage of the adhesive through the dispensing passage.

* * * * *